(12) United States Patent
Sweetland et al.

(10) Patent No.: US 7,739,129 B2
(45) Date of Patent: Jun. 15, 2010

(54) BENEFIT PLAN INTERMEDIARY

(75) Inventors: Christopher L. Sweetland, San Francisco, CA (US); Loren E. McCaghy, Jr., East Hampton, CT (US); Charles A. Nunn, Brooklyn, NY (US); Neville Q. Hamilton, Alameda, CA (US); Richard D. Cornelius, Telluride, CO (US)

(73) Assignee: Accenture Global Services GmbH, Schaffhausen (CH)

( * ) Notice: Subject to any disclaimer, the term of this patent is extended or adjusted under 35 U.S.C. 154(b) by 369 days.

(21) Appl. No.: 11/401,764

(22) Filed: Apr. 10, 2006

(65) Prior Publication Data

US 2007/0239493 A1 Oct. 11, 2007

(51) Int. Cl.
*G06Q 50/00* (2006.01)
*G06Q 40/00* (2006.01)
(52) U.S. Cl. .............................................. 705/2; 705/4
(58) Field of Classification Search ...................... 705/4, 705/2
See application file for complete search history.

(56) References Cited

U.S. PATENT DOCUMENTS

| | | | |
|---|---|---|---|
| 5,710,578 A * | 1/1998 | Beauregard et al. | 345/441 |
| 6,108,641 A * | 8/2000 | Kenna et al. | 705/35 |
| 6,383,136 B1 | 5/2002 | Jordan | |
| 6,834,290 B1 | 12/2004 | Pugh et al. | |
| 7,039,593 B2 * | 5/2006 | Sager | 705/4 |
| 7,133,840 B1 * | 11/2006 | Kenna et al. | 705/35 |
| 7,174,302 B2 * | 2/2007 | Patricelli et al. | 705/4 |
| 7,191,151 B1 * | 3/2007 | Nosek | 705/39 |
| 7,392,201 B1 | 6/2008 | Binns et al. | |
| 2002/0088849 A1 * | 7/2002 | Nichols et al. | 235/379 |
| 2002/0133467 A1 * | 9/2002 | Hobson et al. | 705/64 |
| 2003/0018515 A1 | 1/2003 | Guler et al. | |
| 2003/0023549 A1 * | 1/2003 | Armes et al. | 705/40 |

(Continued)

FOREIGN PATENT DOCUMENTS

WO 91/15817 * 10/1991

(Continued)

OTHER PUBLICATIONS

John Hancock Life Insurance Company Now Offering CPI-Linked Bonds Directly to Retail Marketplace PR Newswire. New York: Mar. 23, 2004. p. 1.

(Continued)

*Primary Examiner*—Luke Gilligan
*Assistant Examiner*—Robert Sorey
(74) *Attorney, Agent, or Firm*—Fish & Richardson P.C.

(57) ABSTRACT

A method may receive data comprising a request to assure payment for a transaction with a consumer, the transaction being associated with a provision of a service or a sale of a product. Thereafter, it may be determined whether payment of at least a portion of the transaction will be covered by a benefit plan associated with the consumer, and additionally, whether the consumer is able to pay for at least a portion of the transaction not covered by the benefit plan. Data is then transmitted authorizing the transaction if a predetermined amount of the transaction will be covered by at least one of the benefit plan or the consumer. Related apparatuses, computer program products, and computer systems are also described.

13 Claims, 5 Drawing Sheets

U.S. PATENT DOCUMENTS

| | | | | |
|---|---|---|---|---|
| 2003/0069760 | A1* | 4/2003 | Gelber | 705/4 |
| 2003/0154107 | A1 | 8/2003 | Medvedeff | |
| 2003/0191703 | A1 | 10/2003 | Chen et al. | |
| 2004/0006488 | A1 | 1/2004 | Fitall et al. | |
| 2004/0049452 | A1* | 3/2004 | Blagg | 705/39 |
| 2004/0093242 | A1* | 5/2004 | Cadigan et al. | 705/4 |
| 2004/0117302 | A1* | 6/2004 | Weichert et al. | 705/40 |
| 2004/0139008 | A1* | 7/2004 | Mascavage, III | 705/40 |
| 2004/0148203 | A1* | 7/2004 | Whitaker et al. | 705/4 |
| 2004/0155101 | A1* | 8/2004 | Royer et al. | 235/379 |
| 2004/0249745 | A1* | 12/2004 | Baaren | 705/39 |
| 2005/0010466 | A1 | 1/2005 | Wegleitner et al. | |
| 2005/0137912 | A1 | 6/2005 | Rao et al. | |
| 2005/0171898 | A1* | 8/2005 | Bishop et al. | 705/39 |
| 2005/0240447 | A1 | 10/2005 | Kil et al. | |
| 2005/0251428 | A1 | 11/2005 | Dust et al. | |
| 2005/0261968 | A1* | 11/2005 | Randall et al. | 705/16 |
| 2005/0273431 | A1* | 12/2005 | Abel et al. | 705/42 |
| 2006/0085230 | A1 | 4/2006 | Brill et al. | |
| 2006/0095316 | A1 | 5/2006 | Stevenson et al. | |
| 2006/0129428 | A1 | 6/2006 | Wennberg | |
| 2006/0143049 | A1 | 6/2006 | Dean | |
| 2006/0167735 | A1 | 7/2006 | Ward | |
| 2006/0190301 | A1 | 8/2006 | Sachdeva | |
| 2006/0287947 | A1* | 12/2006 | Toms | 705/38 |
| 2006/0293928 | A1 | 12/2006 | Schumacher et al. | |
| 2007/0011088 | A1* | 1/2007 | Cracchiolo et al. | 705/39 |
| 2007/0023504 | A1 | 2/2007 | Blankenship et al. | |
| 2007/0162308 | A1 | 7/2007 | Peters | |
| 2007/0260540 | A1* | 11/2007 | Chau et al. | 705/40 |
| 2008/0010189 | A1* | 1/2008 | Rosenberger | 705/39 |
| 2008/0071578 | A1 | 3/2008 | Herz et al. | |
| 2008/0262939 | A1* | 10/2008 | Sun et al. | 705/26 |

FOREIGN PATENT DOCUMENTS

| | | |
|---|---|---|
| WO | WO9115817 A1 | 10/1991 |

OTHER PUBLICATIONS

Rate of Increase for Health Costs May Be Slowing —Fewer Hospital Visits, Use of Generic Drugs Contribute to Lower Inflation for Care by Barbara Martinez. Wall Street Journal. (Eastern edition). New York, NY: Jun. 11, 2003. p. A. 1.

Business pays for insurance; [Final Edition] Phil Galewitz. Las Vegas Review—Journal. Las Vegas, Nev.: Dec. 14, 1999. p. 1.d.

* cited by examiner

BENEFIT PLAN INTERMEDIARY

TECHNICAL FIELD

The subject matter described herein relates to processing benefit plan payment requests.

BACKGROUND

Increasing healthcare insurance costs have driven consumers to seek alternatives to traditional employer-sponsored healthcare benefit plans that provide full coverage for medical treatments and for prescription coverage. Consumers are opting for lower premiums and coverage that requires greater out-of-pocket payments than typical co-payments and deductibles. In addition, consumers are also increasingly using medical spending accounts with tax incentives to pay for healthcare related transactions. As a result, for each and every transaction, service providers (e.g., doctors) often need to make claims from multiple sources (e.g., the consumer, one or more benefit plans, benefit spending accounts, etc.).

FIGS. 1-3 illustrate various conventional healthcare insurance payment mechanisms. As can be appreciated, the variety of payment sources and cost sharing plans utilized by consumers can be complex and can result in increased transaction costs such as resource consumption, timeliness of payments, administration costs, collections, and the like.

With reference to the process flow diagram 100 of FIG. 1, a consumer 110 receives healthcare/treatment from a provider 120 and, at step 115, pays a member cost share for the treatment (e.g., a relatively small co-pay, co-insurance deductible, etc.). Thereafter, the provider 120, at step 125, files a claim with a health plan 130 that, at step 135, reimburses provider 120 the amount covered as provided by the terms and conditions of the plan. The provider 120 may then, at step 145, bill the consumer 110 for any remaining uncovered costs of the treatment.

In an alternative conventional arrangement, as illustrated in the process flow diagram 200 of FIG. 2, a consumer 210 may receive healthcare/treatment from a provider 220 and, at step 215, pay a portion (or all) of the costs of the treatment. The provider 220 may then, at step 225, file a claim with the health plan 230 for payment for the treatment, and the consumer 210 may, at step 235, separately file a claim with the health plan 230 for reimbursement of any payments.

With reference to the process flow diagram 300 of FIG. 3, another variation is provided in which consumer 310 receives healthcare/treatment from provider 320 and, at step 315, pays a significant portion (or all) of the cost of the treatment (co-pay, co-insurance, deductible, etc.) directly to the provider 320. The provider 320, at step 325, files a claim with a health plan 330 of the consumer 310 that may, in turn, at step 335, pay the provider 320 the full amount specified in the filed claim or a portion thereof. In addition, the consumer 310 may, at step 345, draw from funds from a financial institution 340 equal to all or a portion of the amount paid by the consumer 310 out-of-pocket for the treatment. The financial institution 340 may manage or operate tax-advantaged, health specific savings accounts (e.g., FSA—flexible spending accounts, HRA—health reimbursement accounts, HSA—health savings accounts, etc.) that may be used for qualified healthcare treatments/prescriptions.

SUMMARY

In one aspect, a computer-implemented method includes receiving data comprising a request to assure payment for a transaction with a consumer (e.g., an individual or other entity). The transaction is associated with a provision of a service or a sale of a product. Whether payment of at least a portion of the transaction will be covered by a benefit plan associated with the consumer and whether the consumer is able to pay for at least a portion of the transaction not covered by the benefit plan are automatically determine. Data authorizing the transaction is automatically transmitted if a predetermined amount of the transaction will be covered by at least one of the benefit plan or the consumer.

In some variations, the method may also include at least one of generating, by a service provider, the request to assure payment or verifying that the request identifies a category of transaction, a service provider, and the consumer. The transmitted data may identify portions (e.g., an amount) of the transaction not covered by the benefit plan. This arrangement may be useful to present a consumer with an estimate of his or her expected out-of-pocket expenses (after taking into account any benefit plans or other payment sources). Depending on the level of such expenses, a consumer may then decide whether to proceed with the transaction.

In order to determine whether the transaction is covered by a benefit plan, or what portion of the transaction may be covered by a benefit plan, a standard benefit plan reimbursement rate may be associated with the transaction and/or a category associated with the transaction. This standard benefit plan reimbursement rate may then be compared with the requested payment in order to determine a coverage level. In addition, or in the alternative, it may also be determined whether the consumer has claims against the benefit plan exceeding a predetermined payment threshold. In other words, the method may determine whether payment of all or a portion of the transaction will exceed any coverage limits for the benefit plan.

In some variations, it is determined whether the consumer has an associated spending account (e.g., FSA, HRA, HSA, etc.) that may be drawn upon for payment of at least a portion of the transaction. The spending account may provide certain benefits to the consumer (e.g., tax savings, employer contribution, etc.) as compared to payment from a traditional savings account. If spending accounts are drawn upon, then the authorizing may also take into account whether a predetermined amount of the transaction will be covered by the spending account.

The method, in some variations, determines whether the consumer has sufficient credit and/or available funds in a financial institution account to cover any portions of the transaction not covered by the benefit plan. In addition or in the alternative, a risk assessment may be performed to determine whether the consumer is likely to cover any portions of the transaction not covered by the benefit plan. Such factors may be taken into account to determine whether one or more entities will guarantee payment of the transaction.

The method may also include verifying that the transaction has occurred. This verification may require obtaining confirmation from a provider or consumer or an associated network node, or it may, for example, poll or otherwise access an inventory control system or a billing system to independently confirm that the transaction has taken place.

After the request has been authorized, the method may further comprise transmitting data including a claim for the transaction to a network node associated with the benefit plan. In addition or in the alternative, the method may further comprise transferring, from a bank account associated with the benefit plan to a bank account associated with a service provider, funds equal to the portion of the payment for the transaction covered by the benefit plan. Yet further, the method may optionally also comprise debiting an account associated with the consumer sufficient to cover a portion of the payment for the transaction not covered by the benefit plan.

In yet other variations, the method may comprise identifying a plurality of benefit plans associated with at least one of the consumer and the transaction and sequentially polling each of the benefit plans to determine if any portion of the transaction will be covered. Such plurality of benefit plans may be ranked according to predetermined primacy criteria (e.g., employer sponsored plan, self-insured plans, etc.). This ranking may be used to determine the order in which the benefit plans are polled.

In an interrelated aspect, a computer-implemented method includes receiving data comprising a request to pre-authorize payment for a transaction with a consumer. The transaction is associated with a provision of a service or a sale of a product. It may be thereafter automatically be determined whether (i) payment of at least a portion of the transaction will be covered by at least one benefit plan associated with the consumer, (ii) payment of at least a portion of the transaction will be covered by at least one benefit spending account associated with the consumer, and (iii) the consumer is able to pay for at least a portion of the transaction not covered by both of the at least one benefit plan and the at least one benefit spending account. Data pre-authorizing the transaction is automatically transmitted if a predetermined amount of the transaction will be covered by at least one of the at least one benefit plan, the at least one benefit spending account, or the consumer.

In another interrelated method, a computer-implemented method may comprise receiving data comprising a request to approve a transaction with a consumer, the transaction requiring a payment and being associated with a provision of a service or a sale of a product, associating at least one of the consumer and the transaction with one or more payment sources, ranking each of the associated one or more payment sources into a ranking order based on predetermined coverage priorities for the transaction, sequentially polling each of the associated one or more payment sources according to the ranking order until it is determined that a predetermined amount of payment will be covered by the polled one or more payment sources, and transmitting data approving the transaction if a predetermined amount of the transaction will be covered by the polled one or more payment sources.

In yet another aspect, an apparatus may comprise a receiver to receive a request to assure payment for a transaction with a consumer, the transaction being associated with a provision of a service or a sale of a product, a determination unit to determine whether payment of at least a portion of the transaction will be covered by a benefit plan associated with the consumer, and to determine whether the consumer is able to pay for any portions of the transaction not covered by the benefit plan, and an authorization unit to send data authorizing the transaction if a predetermined amount of the transaction will be covered by at least one of the benefit plan or the consumer.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein may provide any of several advantages. For example, the subject matter described herein provides a risk-based solution that allows a centralized intermediary to provide an initial indication whether payment for a particular service or product is likely and/or to process payment requests in real-time. Such a risk-based solution allows relevant data (e.g., member eligibility, benefits remaining, available funds, etc.) to be timely considered. It also allows a decision to be made on risk using data available at the time of the request (i.e., the solution may estimate payment amount and availability of funds to cover such amount) so that a service provider may receive assurance of payment at a point of service (with or without participation/input from a benefit plan). Moreover, the intermediary can act to provide a single remittance to a service provider from multiple payment sources (e.g., member, benefit plan, benefit savings accounts, credit/debit cards, etc.).

In some variations, the risk-based solution is further bolstered by real-time claim adjudication. This real-time claim adjudication provides additional advantages in that the intermediary may receive immediate feedback from potential payment sources. Such feedback may also provide an actual payment coverage amount which in turn can be conveyed to a consumer and/or service provider. With such an arrangement, there is minimized risk for the consumer and/or service provider to be presented with unexpected costs after a transaction.

The subject matter described herein also provides benefits to health plans by allowing them to preserve their network relationships, reduce back-end claims adjudication, customer service and clearinghouse costs, bring new products/services to market more rapidly, reduce implementation costs for plans that do not currently have benefit savings accounts or need to scale up existing products, reduce administrative overhead, and reduce in-house spending on communications and data handling.

Service providers will also benefit from the subject matter described herein by reducing costs associated with bad patient debt and fraud, reducing administrative and processing costs (and in particular, billing & collections), improving cash flow and increasing certainty of payment, simplifying predictive pricing, reduced dependency on clearing houses, and the like. In addition, other entities such as financial institutions may benefit from the subject matter described herein by receiving payments for handled transactions, interest on lines of credit, and other additional revenue sources.

Advantages from the consumer point of view may include easy, seamless access to spending account funds, a single access point for coordinated benefits and spending accounts, consolidated statement for all activity, increased transparency of healthcare costs, increased ease of access to information related to healthcare reimbursement, lower costs for benefits, and the like.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
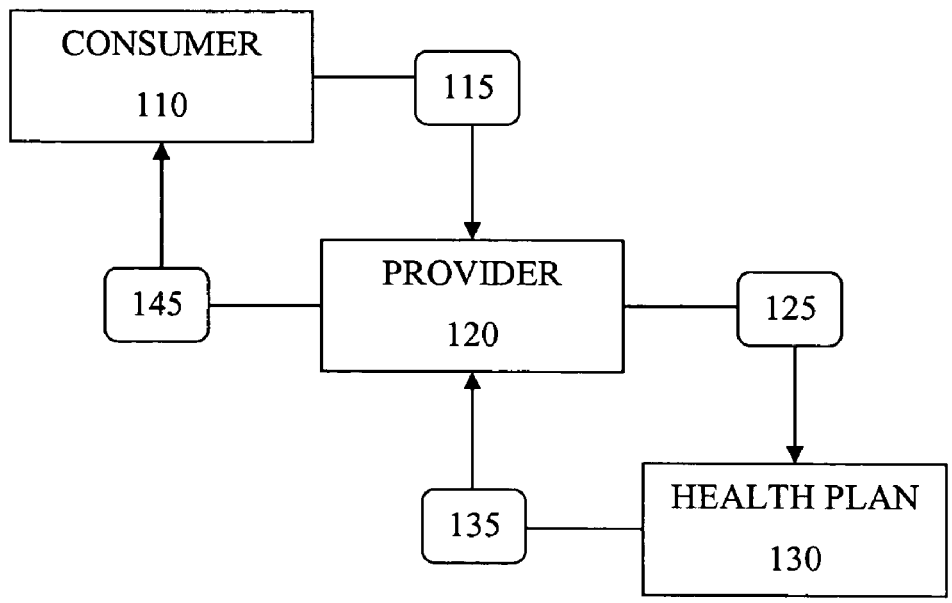
FIG. 1 is a process flow diagram illustrating a first heath care insurance plan arrangement.
Figure 2:
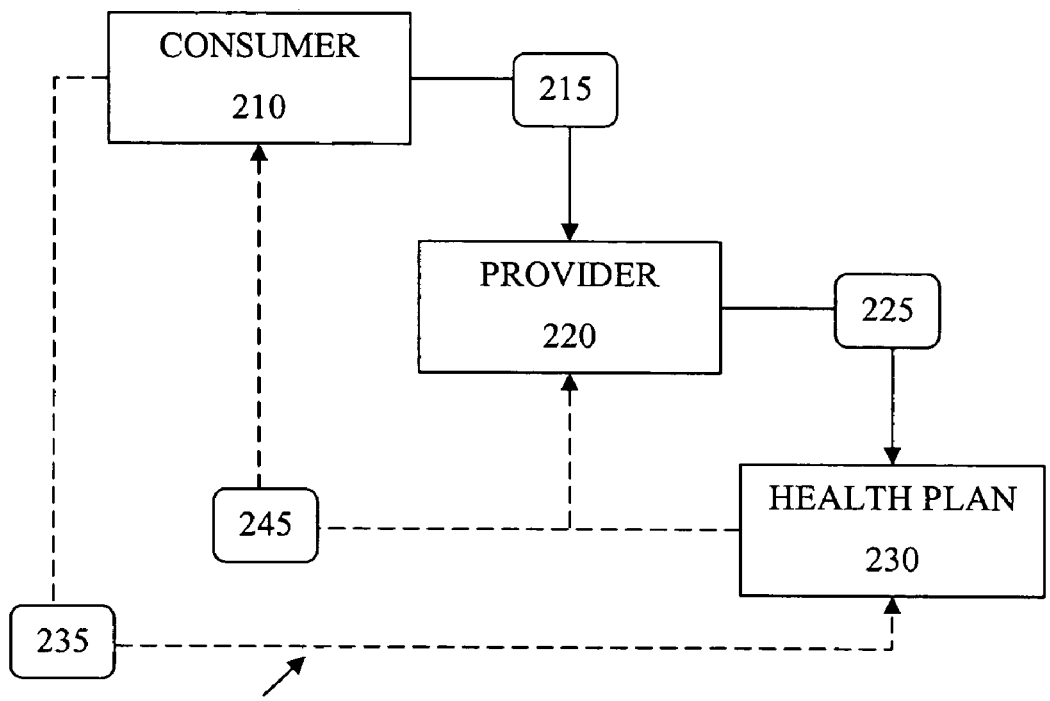
FIG. 2 is a process flow diagram illustrating a second heath care insurance plan arrangement.
Figure 3:
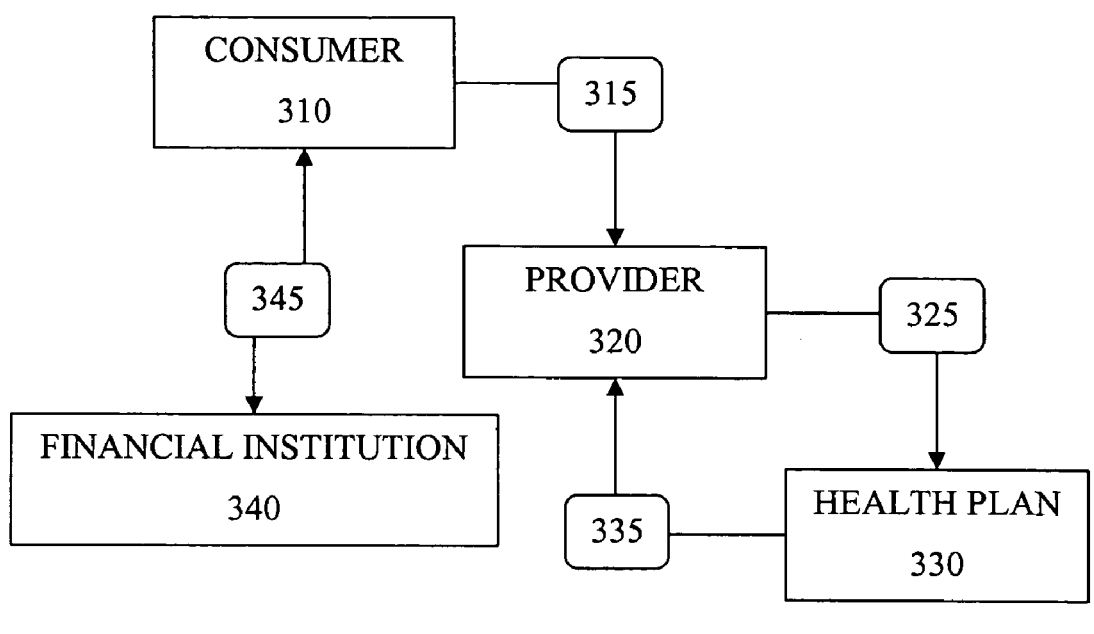
FIG. 3 is a process flow diagram illustrating a third heath care insurance plan arrangement.
Figure 4:
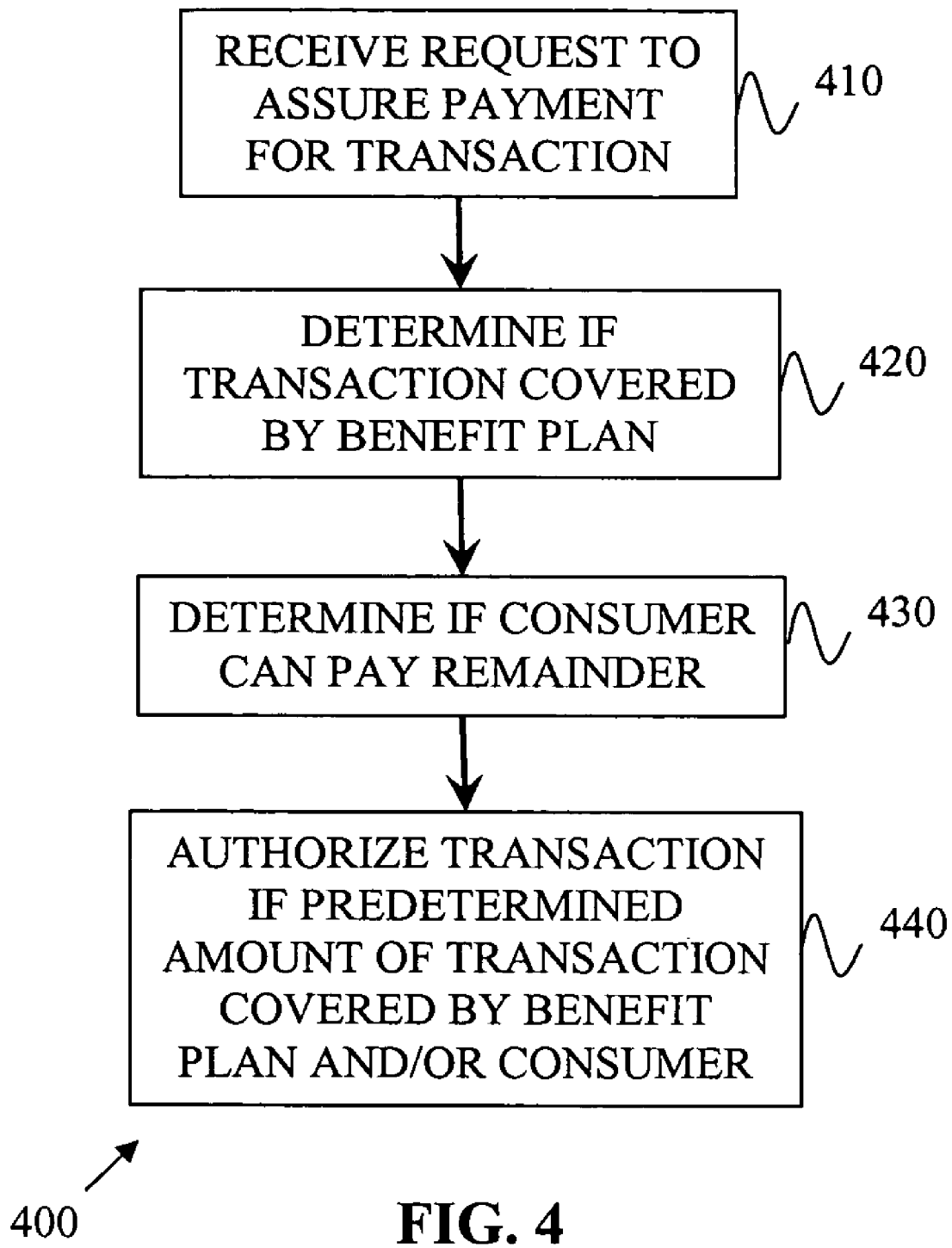
FIG. 4 is a process flow diagram illustrating a method that can be used to assure payment of a transaction.

FIG. 4 illustrates a method 400 in which, at step 410, data comprising a request to assure payment for a transaction with a consumer is received. This transaction is associated with the provision of a service on behalf of the consumer and/or the sale or lease of a product to the consumer, and the like. Thereafter, at step 420, it is determined whether payment of at least a portion of the transaction will be covered (or is eligible to be covered) by a benefit plan (or other payment source) associated with the consumer. Subsequently, it is determined, at step 430, whether the consumer is able to pay for at least a portion of the transaction not covered by the benefit plan. If a predetermined amount will be covered by at least one of the benefit plan or the consumer, then data authorizing or otherwise approving or indicating the ability of the consumer to pay for the transaction is transmitted.

Figure 5:
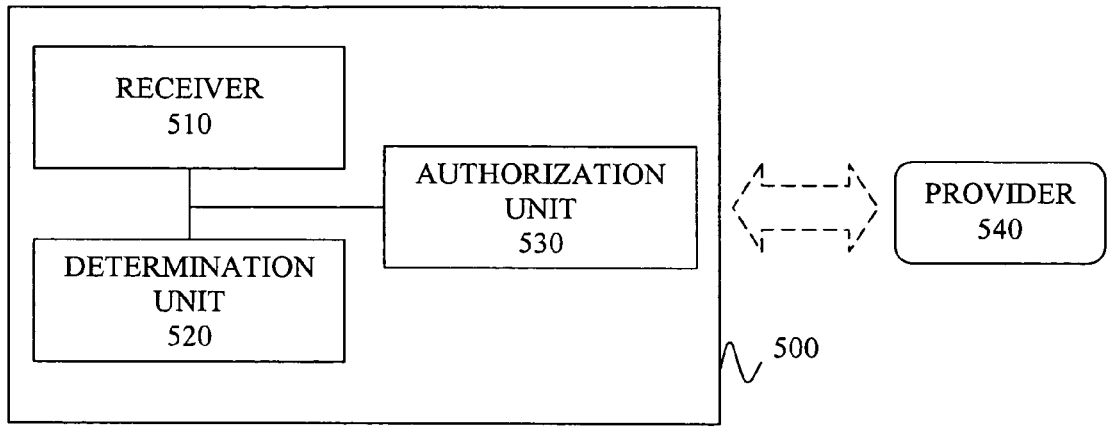
FIG. 5 is a schematic diagram illustrating an apparatus to assure payment of a transaction.

FIG. 5 illustrates an apparatus 500 that comprises a receiver 510, a determination unit 520, and an authorization unit 530. The receiver 510 is operable to receive a request to assure payment for a transaction with a consumer. Such a transaction may be associated with provision of a service or a sale of a product. It may additionally or in the alternative, be associated with lease of products, etc. The determination unit 520 is operable to determine whether payment of at least a portion of the transaction will be covered (or is eligible to be covered) by a benefit plan associated with the consumer. The determination unit 520 is also operable to determine whether the consumer is able to pay for any portions of the transaction not covered by the benefit plan. The authorization unit 530 is operable to send data authorizing the transaction (or indicating that the consumer and any associated benefit plans are likely to be able to pay for the transaction) if a predetermined amount of the transaction will be covered (or is eligible for coverage) by at least one of the benefit plan or the consumer. Optionally, the apparatus 500 may be coupled to a provider 540 or point of service module that receives the message from the authorization unit 530.

The following provides useful information for understanding and implementing the subject matter described herein as well as optional variations that may be implemented singly or in combination depending on the desired configuration.

As used herein, the terms consumer and member may refer to an individual or other entity. In addition, the terms provider or service provider may refer both to entities providing services (e.g., medical doctors, medical groups, leasing companies, etc.) as well as those selling and/or leasing products (e.g., pharmacies selling medicine, etc.).

Figure 6:
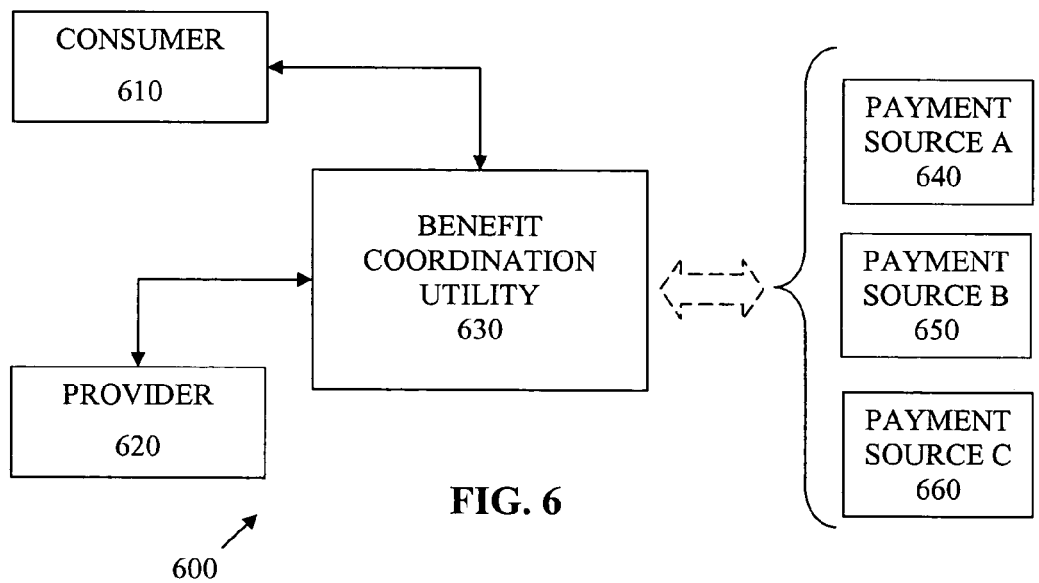
FIG. 6 illustrates a schematic diagram of a benefit coordination utility useful for understanding and implementing the subject matter described herein.

With reference to FIG. 6, a system 600 is illustrated that may include a consumer module 610, a provider module 620, a benefit coordination utility 630 which may include or be coupled to one or more payment source modules 640, 650, 660 (e.g., consumer finances/credit module, benefit plan modules, financial institution modules, etc.). Each of the consumer module 610, provider module 620, benefit coordination utility 630, and payment source modules 640, 650, 660 may comprise network nodes coupled together by a computer network, such as a LAN, Internet, virtual private networks and the like.

In one variation, one of the consumer module 610 or the provider module 620 sends a request from a consumer to the benefit coordination utility 630 for payment of a transaction. The benefit coordination utility 630 may determine whether any portion of the costs of the transaction may be covered by one of a variety of payment sources (e.g., benefit plan, benefit spending account, bank account) associated with the payment source modules 640, 650, 660. This payment source determination may be based on data pertaining to the customer (e.g., benefit plan identification number, etc.) and/or it may be based on the category of transaction (e.g., elective cosmetic surgery, etc.). For example, in one variation, the benefit coordination utility 630 polls one or more of the payment source modules 640, 650, 660 to determine whether the transaction is eligible for coverage. In other variations, the benefit coordination utility 630 first associates the customer and/or transaction with one or more of the payment source modules 640, 650, 660 (i.e., it down selects potential payment sources) and subsequently polls the associated payment source modules 640, 650, 660 to determine eligibility.

The payment source modules 640, 650, 660 may respond to the polling by indicating what, if any, portion of the transaction will be covered. The response by the payment sources modules 640, 650, 660 may also optionally include or coincide with a transfer of funds by the payment source to the benefit coordination utility 630 or a bank account associated with the consumer or the provider (depending on whether the consumer has paid for the transaction and is seeking reimbursement or if the provider is seeking payment for the transaction). In addition, the benefit coordination utility 630 may also draw from a credit line or other credit/debit sources associated with the consumer providing that the payment sources cannot cover all of the payment request.

The benefit coordination utility 630 may send requests for reimbursement/pre-authorization of a transaction to multiple payment source modules 640, 650, 660 of a single category. For example, the benefit coordination utility 630 may associate the consumer (via the request) with multiple benefit plans and/or multiple benefit spending accounts. In some variations, the benefit coordination utility 630 may, for example, rank each of the benefit plans and sequentially send requests for reimbursements to the corresponding payment source modules 640, 650, 660 according to rank until either a predetermined amount of the payment is covered (e.g., 75%, 100%, etc.) or until each benefit plan module has been polled. The rankings of the benefit plans may be based on predetermined criteria such as whether a benefit plan is employer sponsored or if the consumer is self-insured, whether a primary member on a benefit plan is the consumer or the spouse/partner of the consumer, whether a benefit plan includes any primacy provisions, and the like. Similar rankings and polling techniques may be made for other payment sources such as benefit savings accounts.

The benefit coordination utility 630 may assess and collect various transaction/access fees associated with the requests/data transfer among the various components. For example, a transaction fee may be charged to the provider when funds are being transferred to the provider module 620. Administration fees may be assessed when an account in the consumer finances/credit module is drawn upon. The benefit coordination utility 630 may also charge either a flat fee or a transaction-based fee to each of the payment sources 650, 660, 670 to capture some of the cost savings that result from using the centralized benefit coordination utility 630.

The consumer module 610 and/or the provider module 620 may be provided or situated at a point of service for the transaction. The consumer module 610 and/or provider module 620 may include or be coupled to a card reader or other device in which a consumer or other individual at a point of service may rapidly obtain (e.g., swipe) information regarding the consumer. The card reader may be similar to a conventional credit card authorization reader and may also include a printer or display that can be used to indicate whether a payment request or pre-authorization is approved or authorized.

Figure 7:
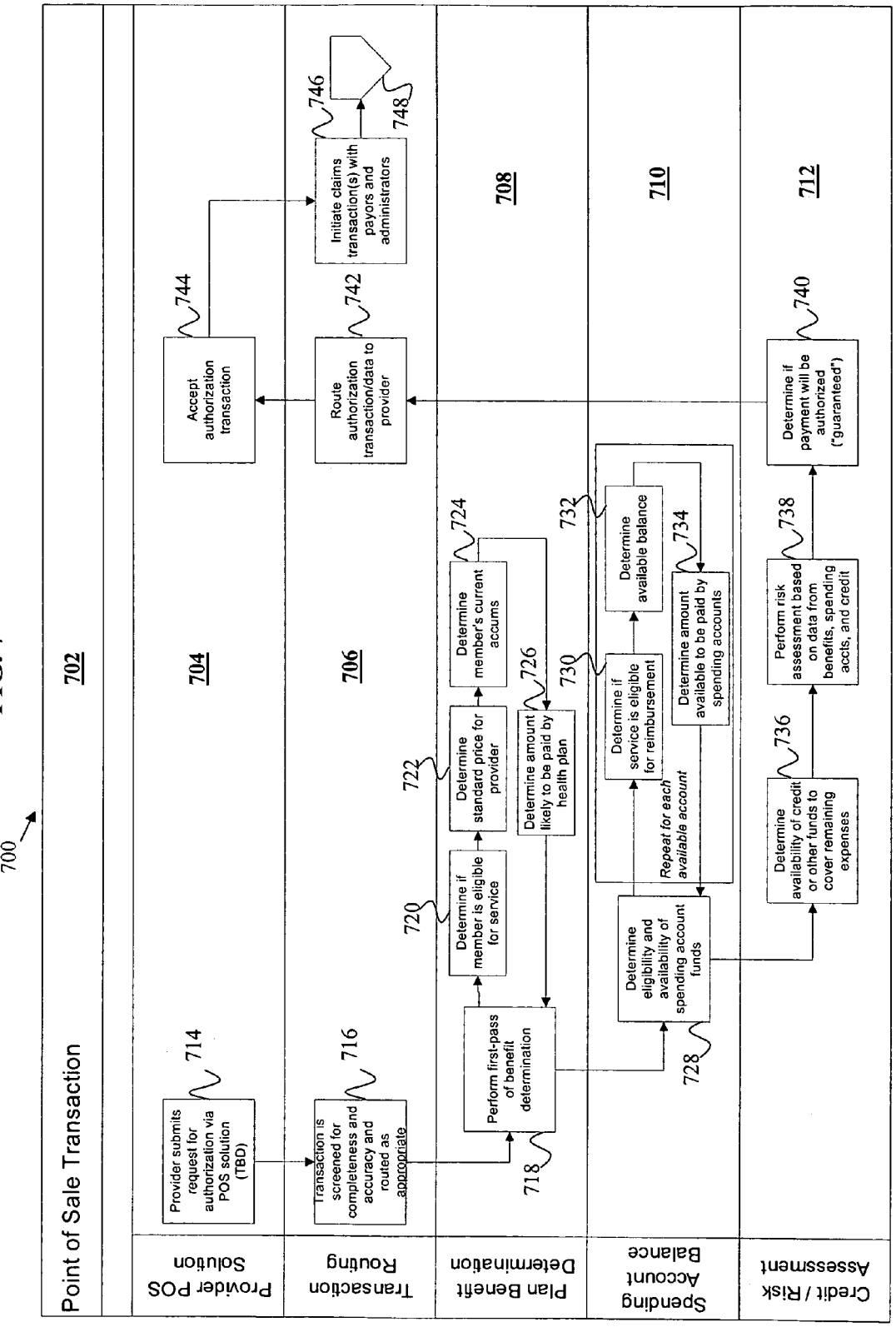
FIG. 7 illustrates a process flow diagram relating to a benefit coordination utility useful for understanding and implementing the subject matter described herein.

FIG. 7 illustrates a process flow diagram 700 for authorization or pre-authorization of a point of sale transaction 702. The various components associated with the diagram 700 include a provider point of service (POS) solution module 704, a transaction routing module 706, a plan benefit determination module 708, a spending account balance module 710, and a credit/risk assessment module 712. The process may initiate, at step 714, by a service provider submitting a request for authorization to the provider POS solution module 704. This request, may at step 716, be received by the transaction routing module 706 which screens the transaction to make sure that the request is complete and accurate. The transaction routing module 706 then routes the request to either a default plan benefit module 708 or optionally, to a plan benefit module 706 identified by or associated with data contained within the request (e.g., consumer identification, benefit plan number, etc.).

The benefit plan module 708, when receiving a routed request (or data associated with a request), at step 718, determines whether the transaction is eligible for coverage and/or whether the consumer is a member of one or more predetermined benefit plans. Thereafter, at step 720, it is determined whether the member is eligible for service/coverage. If the consumer is eligible, then at step 730, a standard price associated with the transaction for the provider is determined. At step 724, it is determined whether the current accumulations for the member exceed a predetermined level (e.g., whether the member has reached a deductible level, whether the member has exceeded a certain coverage limit, etc.). Based on the determined standard price and the determined accumulations for the member, at step 726, an amount likely to be paid by the health plan (benefit plan) is determined.

If there are remaining expenses that would not be covered by the benefit plan, then at step 728, it is determined, at the spending account balance module 710, whether the consumer has any associated benefit plan savings/spending accounts. If such associated accounts exist, then, at step 730, it is determined whether the transaction/service is eligible for reimbursement and/or whether the consumer may draw upon such accounts for the transaction. If the accounts may be accessed, then at step 732, the available balances for the accounts may be determined so that, at step 734, an amount available to be paid by the spending accounts may be determined.

If there are still further remaining expenses that would not be covered by the benefit plan or which could not be reimbursed through a benefit spending account, then the credit/risk assessment module 712, may assess the credit of the consumer and determine the amount of available funds (e.g., bank account balances, etc.). This information is used (and optionally information pertaining to the benefit plan and/or spending accounts), at step 738, to perform a risk assessment whether any remaining balances will likely be paid by the consumer. The risk assessment may, in some variation, utilize data obtained by the benefit coordination utility 630 from the service providers, benefit plan providers, and the like regarding risk trends (e.g., fraudulent activities, etc.). Based on this risk assessment, at step 740, it is determined whether payment of the transaction will be authorized and/or assured or guaranteed.

If the transaction is authorized, then the transaction routing module 706, may at step 742, route authorization/transaction data to the provider POS solution module 708, which in turn, at step 744, accepts the authorization of the transaction. Optionally, thereafter, at step 746, claims with payors and administrators may be initiated and subsequently processed at step 748.

In some variations, the request for authorization at step 714 is a request for pre-authorization of a transaction. For example, a provider may wish to determine whether a consumer is likely to pay for a transaction prior to undertaking the transaction (e.g., doctor verifies that patient has coverage/financial ability to pay for surgery). In such cases, there are no claims to process, and as a result, steps 746 and 748 may be omitted.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, while the foregoing primarily refers to medical/health benefit plans, the subject matter described herein may also be applied to other types of benefit plan/insurance coverage (including repair of insured automobiles after accidents, repairs of dwellings covered by homeowners insurance, etc.). Other embodiments may be within the scope of the following claims.

What is claimed is:

1. A computer-implemented method comprising:

receiving, by a computer and from a point of service (POS) device, a pre-authorization request to assure payment for a predetermined amount of a transaction with a consumer prior to a provider undertaking the transaction, the transaction being associated with a provision of a healthcare service, a sale of a healthcare product, or a lease of a healthcare product;

automatically generating, by the computer, prior to undertaking the transaction, a ranking of benefit plans and benefit savings accounts associated with the consumer, wherein automatically generating the ranking further comprises determining at least whether a primary member of a particular benefit plan is the consumer, a spouse of the consumer, or a partner of the consumer, whether a particular benefit plan is employer sponsored, and whether a particular benefit plan includes a primacy provision;

automatically determining, by the computer, an amount of the transaction that is covered by the benefit plans associated with the consumer based on sequentially sending a benefit plan payment request to one or more payment sources associated with each of the benefit plans, according to the ranking of the benefit plans, until the computer has determined that either at least the predetermined amount of the transaction is covered by the benefit plans or until each of the benefit plans has been polled;

automatically determining, by the computer, an amount of the transaction not covered by the benefit plans that is covered by the benefit savings accounts associated with the consumer based on sequentially sending a benefits savings account payment request to one or more payment sources associated with each of the benefit savings accounts, according to the ranking of the benefit savings accounts, until the computer has determined that either at least the predetermined amount of the transaction is covered by the benefit plans and the benefit savings accounts or until each of the benefit savings accounts has been polled;

automatically determining, by the computer, an amount of the transaction that is not covered by the benefit plans and the benefit savings accounts that is covered by a bank or credit account associated with the consumer based on sending a payment request to one or more payment sources associated with the bank or credit account, and determining, by the computer, that at least the predetermined amount of the transactions is covered by the benefit plans, benefits savings accounts, and the bank or credit account;

transmitting, by the computer to the POS device, information for display by the POS device, the information identifying the amount of the transaction that is covered by the benefit plans, the benefit savings accounts, and the bank or credit account, for the consumer;

receiving, by the computer from the POS device, an indication that the information has been conveyed to the consumer, and that the consumer has approved the transaction;

transferring, by the computer, based on the received approval indication, funds in the amounts that are covered by the benefit plans, the benefit savings accounts, and the bank or credit account from the payment sources associated with each of the benefit plans, benefit savings accounts, and the bank or credit account, respectively, to an account associated with the provider prior to undertaking the transaction; and automatically transmitting, by the computer to the POS device, data authorizing the transaction when at least a portion of the predetermined amount of the transaction that is covered by the benefit plans, the benefit savings accounts, or the bank or credit account has been received in the account associated with the provider.

2. The method of claim 1, wherein the transmitted data authorizing the transaction identifies portions of the transaction not covered by the benefit plans.

3. The method of claim 1, further comprising:

verifying, by the computer, that the pre-authorization request identifies a category of the transaction, the provider, and the consumer.

4. The method of claim 1, further comprising:

associating, by the computer, a standard benefit plan reimbursement rate with the transaction; and comparing, by the computer, the payment with the standard benefit plan reimbursement rate.

5. The method of claim 1, further comprising:

determining, by the computer, whether the consumer has claims against the benefit plans exceeding a predetermined payment threshold.

6. The method of claim 1, further comprising:

performing, by the computer, a risk assessment to determine whether the consumer is likely to pay for any portions of the transaction not covered by the benefit plans, wherein the risk assessment is based on information pertaining to the benefit plans and the benefit savings accounts.

7. The method of claim 1, further comprising determining, by the computer, whether to guarantee payment of the transaction based on at least one of the benefit plans and an ability of the consumer to pay for at least a portion of the transaction.

8. The method of claim 1, further comprising transmitting, by the computer, data including a claim for the transaction to a network node associated with at least one of the benefit plans.

9. The method of claim 1, further comprising:

assessing, by the computer, a fee against the provider for providing a service of transferring the funds in amounts to the provider; and transferring, by the computer, the funds in the amounts, minus the assessed fee, to the provider.

10. The method of claim 1, further comprising:
assessing, by the computer, a fee against the consumer for providing a service of transferring the funds in the amounts to the provider; and
transferring, by the computer, the fee from an account associated with the consumer.

11. The method of claim 1, further comprising:
assessing, by the computer, a fee against the one or more payment sources associated with each of the benefit plans, the one or more payment sources associated with each of the benefits savings accounts, or the one or more payment sources associated with the bank or credit account, the fee being for providing a service of transferring the funds in the amounts to the account associated with the provider; and
transferring, by the computer, at least a portion of the fee from the one or more payment sources associated with each of the benefit plans, the one or more payment sources associated with each of the benefits savings accounts, or the one or more payment sources associated with the bank or credit account.

12. A benefit coordination utility system comprising:
a point of service (POS) device configured to send a pre-authorization request to assure payment for a predetermined amount of a transaction with a consumer prior to a provider undertaking the transaction, the transaction being associated with a provision of a healthcare service, a sale of a healthcare product, or a lease of a healthcare product;
one or more computers; and
a computer-readable storage medium coupled to the one or more computers having instructions stored thereon which, when the instructions are executed by the one or more computers, causes the one or more computers to perform operations comprising:
receiving, by the one or more computers and from the point of service (POS) device, the pre-authorization request,
automatically generating, by the one or more computers, prior to undertaking the transaction, a ranking of benefit plans and benefit savings accounts associated with the consumer, wherein automatically generating the ranking further comprises determining at least whether a primary member of a particular benefit plan is the consumer, a spouse of the consumer, or a partner of the consumer, whether a particular benefit plan is employer sponsored, and whether a particular benefit plan includes a primacy provision,
automatically determining, by the one or more computers, an amount of the transaction that is covered by the benefit plans associated with the consumer based on sequentially sending a benefit plan payment request to one or more payment sources associated with each of the benefit plans, according to the ranking of the benefit plans, until the one or more computers have determined that either at least the predetermined amount of the transaction is covered by the benefit plans or until each of the benefit plans has been polled,
automatically determining, by the one or more computers, an amount of the transaction not covered by the benefit plans that is covered by the benefit savings accounts associated with the consumer based on sequentially sending a benefits savings account payment request to one or more payment sources associated with each of the benefit savings accounts, according to the ranking of the benefit savings accounts, until the one or more computers have determined that either at least the predetermined amount of the transaction is covered by the benefit plans and the benefit savings accounts or until each of the benefit savings accounts has been polled,
automatically determining, by the one or more computers, an amount of the transaction that is not covered by the benefit plans and the benefit savings accounts that is covered by a bank or credit account associated with the consumer based on sending a payment request to one or more payment sources associated with the bank or credit account, and determining, by the one or more computers, that at least the predetermined amount of the transactions is covered by the benefit plans, benefits savings accounts, and the bank or credit account,
transmitting, by the one or more computers to the POS device, information for display by the POS device, the information identifying the amount of the transaction that is covered by the benefit plans, the benefit savings accounts, and the bank or credit account, for the consumer,
receiving, by the one or more computers from the POS device, an indication that the information has been conveyed to the consumer, and that the consumer has approved the transaction,
transferring, by the one or more computers, based on the received approval indication, funds in the amounts that are covered by the benefit plans, the benefit savings accounts, and the bank or credit account from the payment sources associated with each of the benefit plans, benefit savings accounts, and the bank or credit account, respectively, to an account associated with the provider prior to undertaking the transaction; and
automatically transmitting, by the one or more computers to the POS device, data authorizing the transaction when at least a portion of the predetermined amount of the transaction that is covered by the benefit plans, the benefit savings accounts, or the bank or credit account has been received in the account associated with the provider.

13. A computer-readable storage medium encoded with a computer program comprising instructions that, when the instructions are executed by a computer, operate to cause the computer to perform operations comprising:
receiving, by a computer and from a point of service (POS) device, a pre-authorization request to assure payment for a predetermined amount of a transaction with a consumer prior to a provider undertaking the transaction, the transaction being associated with a provision of a healthcare service, a sale of a healthcare product, or a lease of a healthcare product;
automatically generating, by the computer, prior to undertaking the transaction, a ranking of benefit plans and benefit savings accounts associated with the consumer, wherein automatically generating the ranking further comprises determining at least whether a primary member of a particular benefit plan is the consumer, a spouse of the consumer, or a partner of the consumer, whether a particular benefit plan is employer sponsored, and whether a particular benefit plan includes a primacy provision;
automatically determining, by the computer, an amount of the transaction that is covered by the benefit plans associated with the consumer based on sequentially sending a benefit plan payment request to one or more payment sources associated with each of the benefit plans, according to the ranking of the benefit plans, until the computer has determined that either at least the predetermined amount of the transaction is covered by the benefit plans or until each of the benefit plans has been polled;

automatically determining, by the computer, an amount of the transaction not covered by the benefit plans that is covered by the benefit savings accounts associated with the consumer based on sequentially sending a benefits savings account payment request to one or more payment sources associated with each of the benefit savings accounts, according to the ranking of the benefit savings accounts, until the computer has determined that either at least the predetermined amount of the transaction is covered by the benefit plans and the benefit savings accounts or until each of the benefit savings accounts has been polled;

automatically determining, by the computer, an amount of the transaction that is not covered by the benefit plans and the benefit savings accounts that is covered by a bank or credit account associated with the consumer based on sending a payment request to one or more payment sources associated with the bank or credit account, and determining, by the computer, that at least the predetermined amount of the transactions is covered by the benefit plans, benefits savings accounts, and the bank or credit account;

transmitting, by the computer to the POS device, information for display by the POS device, the information identifying the amount of the transaction that is covered by the benefit plans, the benefit savings accounts, and the bank or credit account, for the consumer;

receiving, by the computer from the POS device, an indication that the information has been conveyed to the consumer, and that the consumer has approved the transaction;

transferring, by the computer, based on the received approval indication, funds in the amounts that are covered by the benefit plans, the benefit savings accounts, and the bank or credit account from the payment sources associated with each of the benefit plans, benefit savings accounts, and the bank or credit account, respectively, to an account associated with the provider prior to undertaking the transaction; and automatically transmitting, by the computer to the POS device, data authorizing the transaction when at least a portion of the predetermined amount of the transaction that is covered by the benefit plans, the benefit savings accounts, or the bank or credit account has been received in the account associated with the provider.

* * * * *